July 19, 1927. 1,636,530
S. NYHUS
MACHINE FOR SLICING MEAT
Filed Aug. 16, 1926
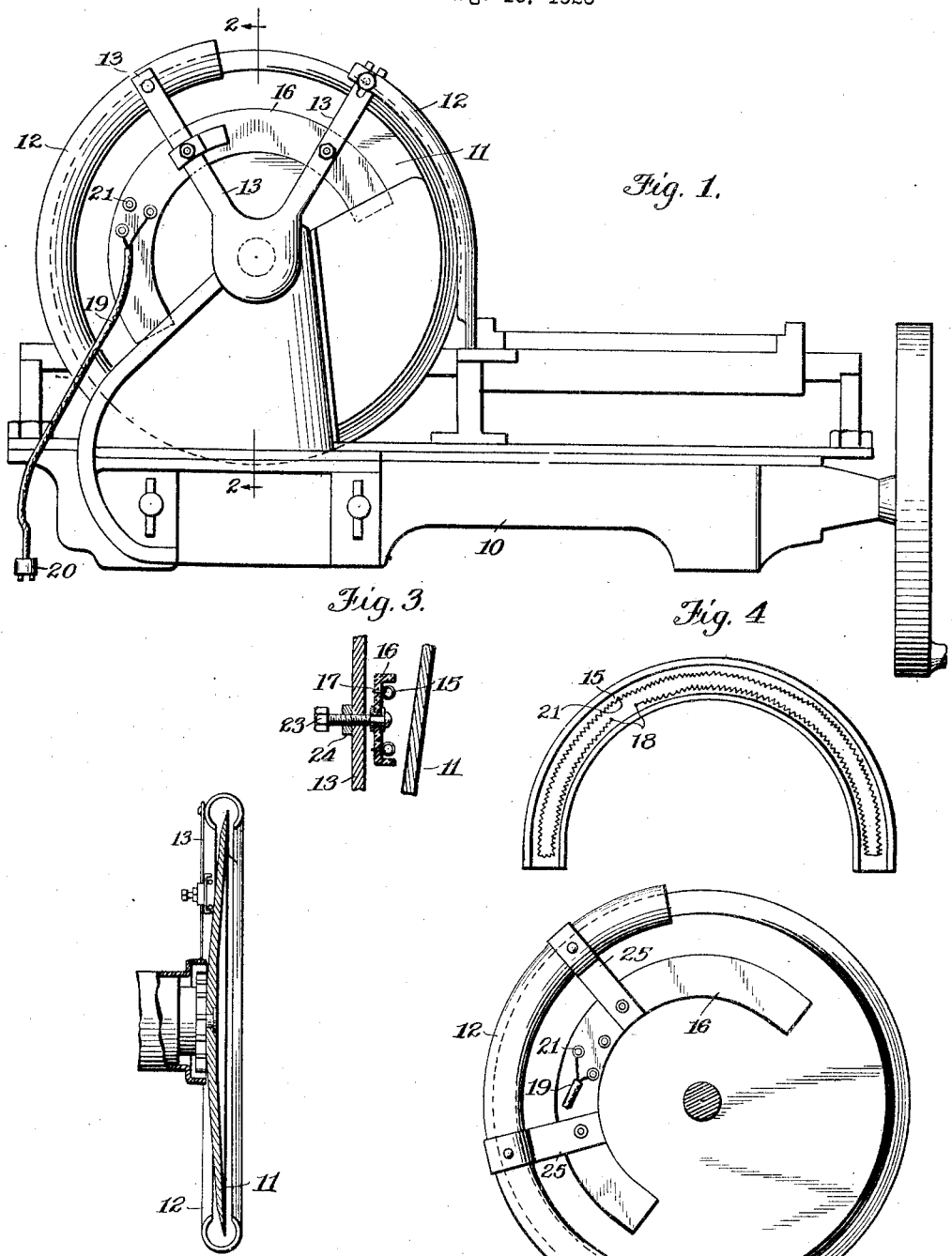

Patented July 19, 1927.

1,636,530

UNITED STATES PATENT OFFICE.

SVERRE NYHUS, OF LILLE-HAMMER, NORWAY, ASSIGNOR TO U. S. SLICING MACHINE COMPANY, OF LA PORTE, INDIANA, A CORPORATION OF INDIANA.

MACHINE FOR SLICING MEAT.

Application filed August 16, 1926, Serial No. 129,411, and in Denmark May 8, 1925.

This invention relates to machines for slicing meat and similar material, and has for its object the provision of means for heating the slicing knife to facilitate cutting.

The invention is exemplified in the combination and arrangement of parts shown in the accompanying drawing and described in the following specification, and it is more particularly pointed out in the appended claims.

In the drawing:—

Fig. 1 is an elevation of a slicing machine having one embodiment of the present invention applied thereto;

Fig. 2 is a vertical section substantially on line 2—2 of Fig. 1;

Fig. 3 is a fragmentary section of the parts shown in Fig. 2 but on a larger scale;

Fig. 4 is an elevation of the inner side of the heating element;

Fig. 5 is an elevation of a modified form of the invention.

The numeral 10 designates the base of a slicing machine having a rotary slicing knife 11 mounted thereon and guards 12 for the edge of the slicing knife supported on arms 13. Machines of this nature are well known and further description is therefore unnecessary.

In slicing some materials, when cold, especially some forms of fat meat, the fat adheres to the surface of the slicing knife, rendering operation difficult and causing the slices to stick to the face of the knife. The present invention provides means for overcoming this difficulty by heating the knife a sufficient amount to prevent the fat from adhering thereto. In the form of the invention illustrated, the knife is heated by an electrical resistance element supported adjacent the face of the knife. This element is indicated in the drawing as a resistance wire 15 mounted on an insulator support 16 which may be U-shaped in cross section, as illustrated in Fig. 3, forming a recess for containing the resistance wire. The support 16 may be of asbestos or other suitable heat resisting, insulating material, and the coils are secured to the inner face of the support 16 by tie wires 17 or in any other convenient manner. The resistance element 15 is provided with terminal members 18 at the ends thereof for attachment to a supply line 19 provided with a plug 20 for connecting the resistance to an electric light circuit or other source of electrical energy. An intermediate terminal 21 may be inserted in the element 15 to which one of the wires of the supply circuit may be attached in order to use only a portion of the resistance element 15. It will be understood that other contact arrangements may be provided for regulating the amount of heating element employed and thus controlling the amount of heat supplied to the knife.

The support is preferably made adjustable toward and away from the face of the slicing knife for further controlling the heating effect upon the knife. The adjustment may be accomplished by means of screws 23 swivelled in the support 16 and threaded in the arms 13. Lock nuts 24 may be provided for holding the heating element in its adjusted position.

Instead of supporting the heating element from the arms 13 it may be supported directly from the guard 12 by brackets 25 attached to the guard, as shown in Fig. 5.

It will be understood that the invention is not confined to the particular form of heating element described but, in its broader aspect, includes any means for heating the slicing knife to facilitate slicing operations.

I claim:

1. A rotary disc slicing machine having a slicing blade, and a heat radiating element disposed adjacent said blade for raising the temperature of said blade.

2. In a slicing machine, the combination of a slicing blade, a heating element disposed adjacent said blade whereby said blade is heated by radiant heat, and means to adjust said heating element toward and away from said blade to vary the intensity of the radiated heat on the blade.

3. A slicing machine comprising a slicing blade, a guard for said blade, and a heating element for said blade supported by said guard.

4. A rotary disc slicing machine comprising a slicing blade, an electrical heating element for raising the temperature of said blade, a support of insulating material for said element, and means for mounting said support adjacent said blade.

5. A slicing machine comprising a slicing blade, an electrical heating element, a support of insulating material for said heating element, means for mounting said support adjacent said blade, and means for adjusting said support toward and away from said blade.

In testimony whereof I have signed my name to this specification.

SVERRE NYHUS.